Oct. 28, 1930.　　　W. EICHHORN　　　1,779,765
ARTIFICIAL FOOT JOINT
Filed March 28, 1928　　2 Sheets-Sheet 1

Inventor:
Wilhelm Eichhorn

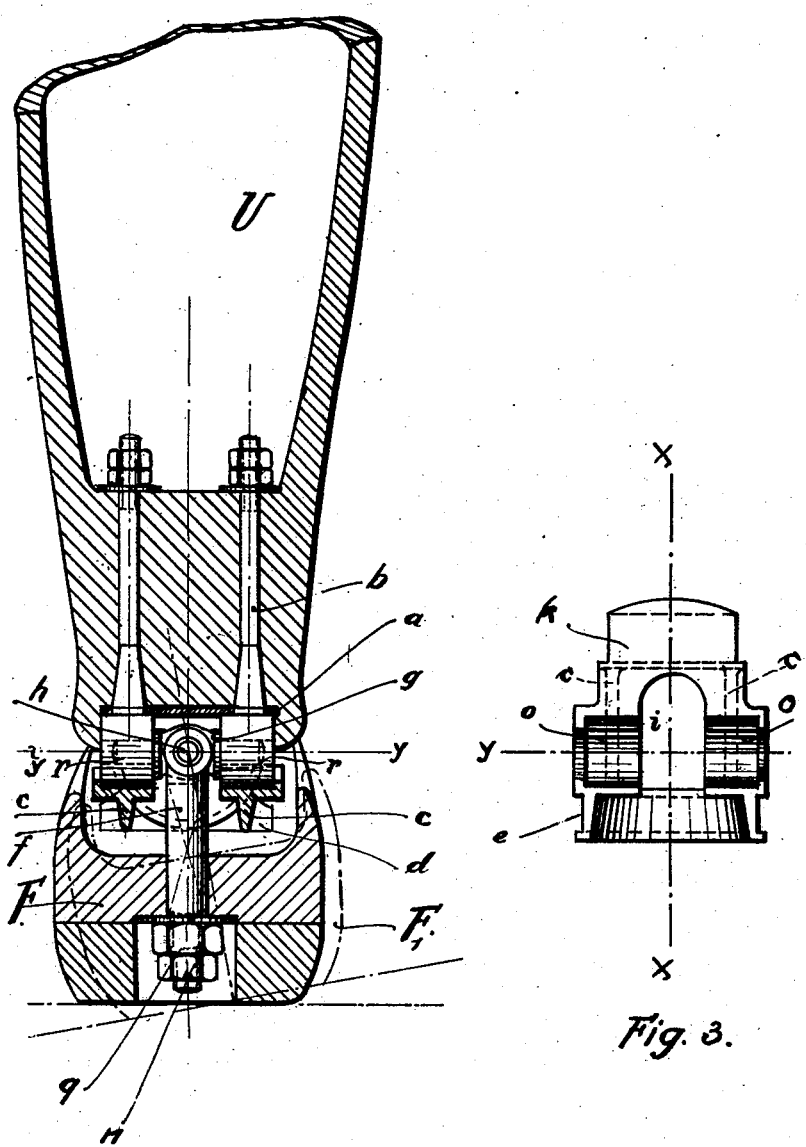

Patented Oct. 28, 1930

1,779,765

UNITED STATES PATENT OFFICE

WILHELM EICHHORN, OF FRANKFORT-ON-THE-MAIN, GERMANY, ASSIGNOR OF ONE-HALF TO THE FIRM OF F. L. FISCHER, OF FREIBURG, BREISGAU, GERMANY

ARTIFICIAL-FOOT JOINT

Application filed March 28, 1928, Serial No. 265,494, and in Germany September 21, 1926.

This invention relates to an artificial foot-joint, by means of which the foot can carry out, with regard to the shank, in a manner known per se, movements around two axes situated in one plane and intersecting one another in the sense of the supination at simultaneous dorsal and plantar flexion.

The movements were heretofore made possible in that in a vertical plane through the center of the joints, between the jointed or connected faces of the shank and of the foot, an intermediate body, pivoted for movement around two axes intersecting in one plane was clamped, the joints of which were formed by the jointed faces engaging one with the other in a saddle-like manner, whereas, in the metatarsus, independently of said joint or of the intermediate body forming the same, a rotary piece was arranged to rotate around the longitudinal axis of the foot, in order to limit the foot movement in the sense of the dorsal-flexion, notwithstanding the released supination.

This invention is an improvement of this foot-joint as it obviates certain defects of the same.

An embodiment of the invention is illustrated, by way of example, in the accompanying drawing, in which:

Fig. 2 is a section displaced 90° to the section in Fig. 1 through the whole device, viewed from the rear.

Fig. 3 shows the intermediate body in top-plan-view.

Figure 1:
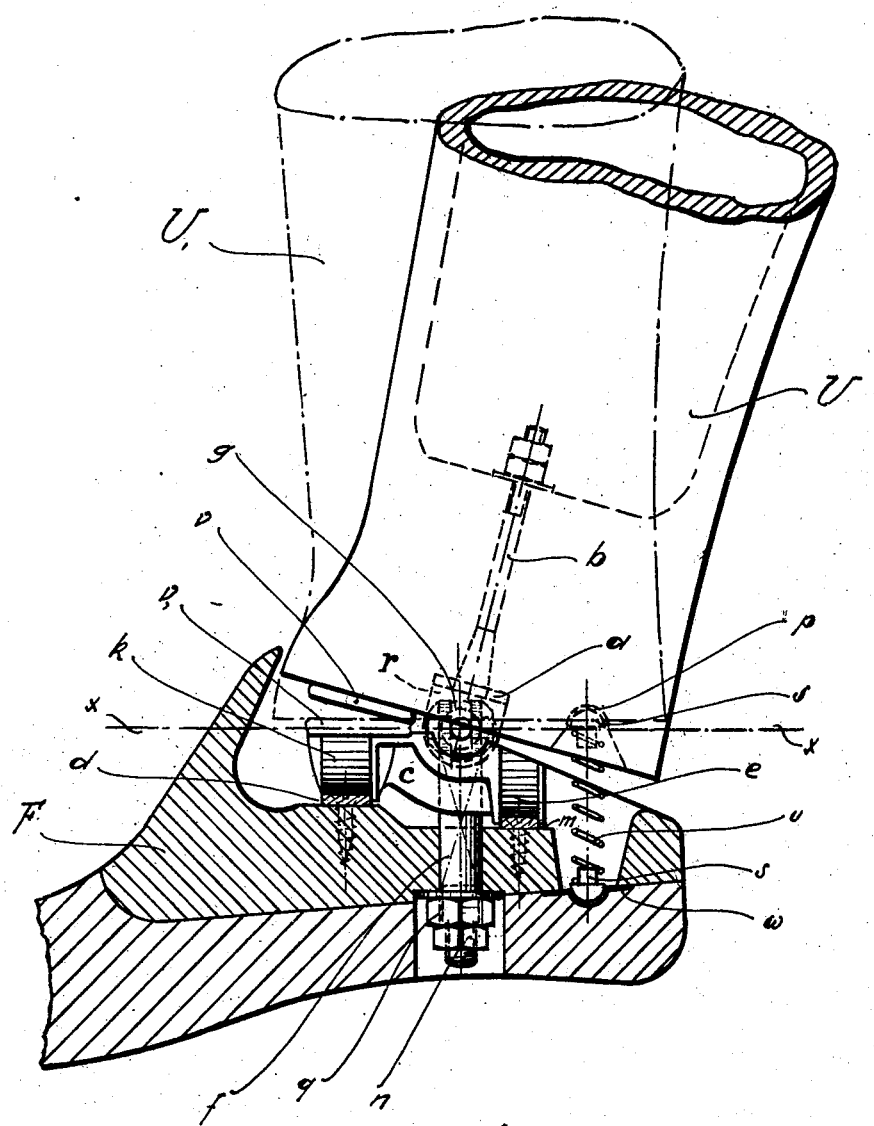
Fig. 1 is a longitudinal section through the foot and a side-elevation of the intermediate body, enabling the lateral movements, the shank being shown in side elevation.

Between the shank U and the foot F an intermediate body is inserted. This intermediate body comprises a rotary element $k$ situated in front of the central cross-section plane and a rotary element $e$ situated behind the central cross-section plane, said elements $k$ and $e$ being connected by ribs $c$ or by other convenient means. The portion between the two rotary elements, having a longitudinal cut-out portion $i$, is constructed like a double seat $o$ and it has bearing faces $o$ formed on arcs around the transverse axis $y$—$y$ of the foot, in order that the shank U may carry out, in a manner known per se, movements around this transverse axis. The convex outer surfaces of the rotary elements $k$ and $e$ of the intermediate body rest in cups $d$, $m$ respectively, fixed on the foot by screws or the like. The intermediate body can also rotate around the longitudinal axis $x$—$x$. The shank and the foot are connected the one with the other by bolts $b$, $b$ and $f$ coupled by a Cardan-joint, the bolt $f$ being securely held in the foot by a nut $q$. For securing the nut $q$ against unscrewing a screw $n$ is axially screwed into the bolt $f$, the threads of said screw having preferably a pitch opposite to that of the nut $q$. This arrangement presents the advantage that it is of little height and more easy to be controlled by the person who wears the artificial leg than locking devices of other types. It is further of light weight. A spiral-spring $u$ is located in a cavity $w$ of the foot and in a cavity $p$ in the lower surface of the shank U, the ends of said spring being wound around short holding heads $s$.

The bolts $b$, securely fixed in the shank (Fig. 2), has heads $r$ forming joint-faces, resting on the cups $o$, and they are mutually stayed by a plate $a$ so that the spacing is permanently secured. The bolt $f$ mounted in the foot carries a cross-piece $g$ constructed after the manner of a Cardan-joint and connected to the heads $r$ of the bolts $b$.

From the drawing it can be seen, that the weight imposed on the shank is permanently transmitted through both bearings $k$, $d$ and $e$, $m$ as well in plantar flexing of the foot F and shank U, as also in dorsal flexing of the foot F, the latter in the manner illustrated in Figure 1, with relation to the shank $U^1$ which latter part is, in consequence of the very considerable pressure imposed upon the shank and against the front rotary element $k$.

The intermediate body $k$, $c$, $e$ in the metatarsus participates in any movements of the foot, even at the extreme plantar flexion, as for example, when walking down hill and also in the transmission of the weight of the body of the person, who wears the artificial leg, from the shank to the foot.

At the putting down of the heel neither the forces downwardly directed from the shank nor the forces upwardly directed from the outermost portion of the heel can exert any tipping moment. For this reason the bearing $e, m$ is arranged behind the central cross-section-plane. The bearings $k, d$ and $e, m$ are therefore always uniformly submitted to stress. As the bearings $k, d$ and $e, m$ carry the load together, each bearing may be considerably smaller than heretofore so that the weight is reduced.

The torsion-forces exerted by the shank U or by the foot F onto the intermediate body are not intercepted as hitherto by flanges but by the joint faces $(k, e)$ formed by the rotation around the longitudinal axis $x$, the joint-faces being sufficiently large for this purpose as they must be dimensioned according to the loadings by the weight of the body. The functioning of the whole foot during one step is as follows:

When the heel of the foot is put down on the ground, the heel-spring $u$ is compressed and the foot slides with the intermediate body $k, c, e$ mounted on it around the convex-joint faces of the bolts $b$ of the shank. The foot carries out definite lateral movements, owing to the more or less slanting putting down of the heel and owing to the condition of the ground.

When the walking continues, the shank U returns into its initial position $U^1$ and loads thereby very strongly the front rotary body.

To ensure a softer and more silent contact a leather $v$ is arranged between the shank and the intermediate body, said leather assuming the position $v^1$ at the initial position of the shank, as indicated in dash-and-dot lines.

I claim:—

An artificial ankle-joint comprising a pivoted bolt perpendicular to the sole of the foot member of said ankle joint enabling lateral movements of the foot member with regard to the shank member of the joint, an intermediate body traversed by said bolt rotatable about the longitudinal axis of said foot member and having two aligned bearings thereon, said bolt being pivoted upon an axis substantially in a horizontal plane extending through the axes of said bearings and two coaxial rotary bearing elements upon said foot member in which said intermediate body is rotatable, a nut on the lower end of said foot bolt, a screw screwed in axial direction into said bolt to lock said nut the thread of said screw having a pitch oppositely directed to that of said nut.

In testimony whereof I affix my signature.

WILHELM EICHHORN.